United States Patent
Seo et al.

(10) Patent No.: US 12,301,763 B2
(45) Date of Patent: May 13, 2025

(54) FAR-END TERMINAL AND VOICE FOCUSING METHOD THEREOF

(71) Applicant: LG ELECTRONICS INC., Seoul (KR)

(72) Inventors: Jaepil Seo, Seoul (KR); Sungmoon Cho, Seoul (KR); Sangjun Oh, Seoul (KR); Hyeonsik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/921,301

(22) PCT Filed: Jun. 7, 2022

(86) PCT No.: PCT/KR2022/008032
§ 371 (c)(1),
(2) Date: Oct. 25, 2022

(87) PCT Pub. No.: WO2023/238965
PCT Pub. Date: Dec. 14, 2023

(65) Prior Publication Data
US 2024/0223707 A1     Jul. 4, 2024

(51) Int. Cl.
*H04M 3/56* (2006.01)

(52) U.S. Cl.
CPC ........... *H04M 3/568* (2013.01); *H04M 3/567* (2013.01)

(58) Field of Classification Search
CPC ........ G06F 3/165; G06F 16/68; G06F 16/635; G06F 3/04847

(Continued)

(56) References Cited

U.S. PATENT DOCUMENTS 8,761,412 B2 * 6/2014 Hernandez-Abrego ..................... H04R 3/005
348/169
8,861,822 B2 * 10/2014 Pagoulatos ............... G06T 5/50
382/284

(Continued)

FOREIGN PATENT DOCUMENTS

JP         2013-214797 A      10/2013

*Primary Examiner* — Alexander Krzystan
(74) *Attorney, Agent, or Firm* — Birch, Stewart, Kolasch & Birch, LLP

(57) ABSTRACT

A far-end terminal including a communication interface configured to wirelessly communicate with a near-end terminal for performing a video conference between the far-end terminal and the near-terminal, a camera configured to capture a region in front of the far-end terminal including a plurality of counterpart speakers, a display configured to display the plurality of counterpart speakers captured through the camera and to display an image of a speaker at the near-end terminal, and a processor configured to receive focusing mode setting information from the near-end terminal indicating an operation mode of the near-end terminal is a wide focusing mode, in response to the focusing mode setting information indicating the operation mode is the wide focusing mode, obtain an angle range corresponding to a narrower partial region of an entire region including the plurality of counterpart speakers at the far-end terminal, perform selective audio focusing on a received voice within the obtained angle range to selectively increase a gain of the received voice and to selectively decrease a gain of other received voices outside the obtained angle range, and transmit audio, which is a result of performing the beamforming, to the near-end terminal.

18 Claims, 13 Drawing Sheets

(58) Field of Classification Search
USPC .......................................................... 700/94
See application file for complete search history.

(56) References Cited

U.S. PATENT DOCUMENTS

| | | | |
|---|---|---|---|
| 10,192,358 B2* | 1/2019 | Robbins | G02B 30/26 |
| 2010/0315482 A1 | 12/2010 | Rosenfeld et al. | |
| 2023/0133265 A1* | 5/2023 | Springer | H04N 7/147 |
| | | | 348/14.03 |

* cited by examiner

FIG. 5
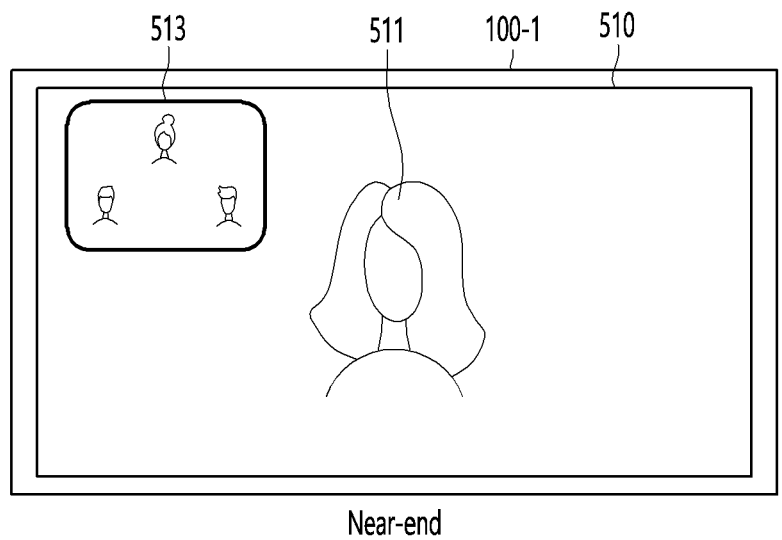
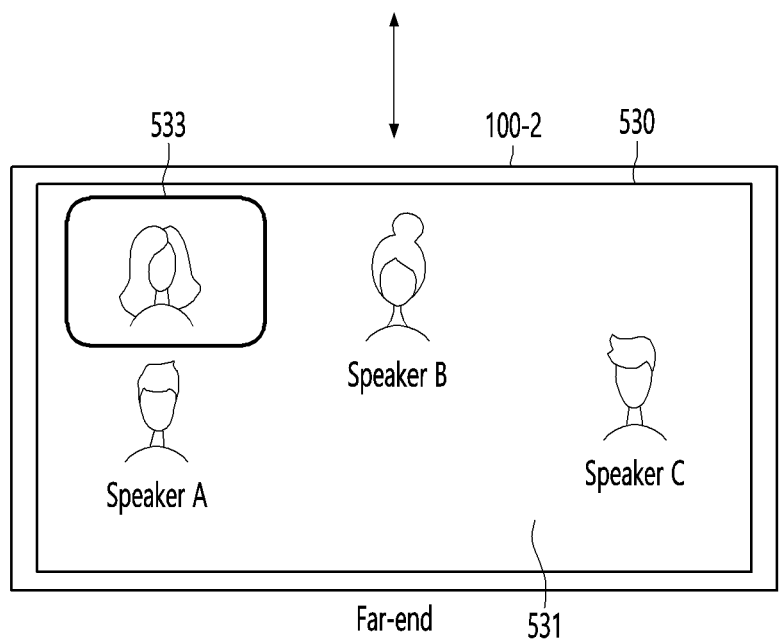

Narrow beamforming

Wide beamforming→40-degree width control

Wide beamforming→60-degree width control

FAR-END TERMINAL AND VOICE FOCUSING METHOD THEREOF

CROSS-REFERENCE TO RELATED APPLICATION

This Application is the National Phase of PCT International Application No. PCT/KR2022/008032 filed on Jun. 7, 2022, which is hereby expressly incorporated by reference into the present application.

BACKGROUND OF THE INVENTION

Field of the Invention

The present disclosure relates to improvement in sound quality of a video conference call.

Discussion of the Related Art

In the era of the COVID-19 crisis, video conferencing systems have become essential and important for the operations of companies around the world. It is likely video conferencing systems will become remain as normal even after the COVID-19 crisis is over. Accordingly, numerous companies are scrambling to establish a video conferencing system, and working hard to develop additional functions and address video conferencing problems. For example, it is difficult for a person to listen to a speaker especially when multiple people are involved in the conference or there is a lot of background noise.

One method used to improve sound quality in a video conference includes executing an Acoustic Echo Cancellation (AEC) algorithm for preventing a howling sound that occurs when a speaking person's voice passes through the speaker and microphone of a counterpart in the conference. Another method includes executing a Noise Reduction (NR) algorithm to remove stationary noise, which is white noise with a constant loudness.

However, these algorithms can only be used with one microphone. In addition, NR algorithms only remove stationary noise and don't remove non-stationary noises such as a TV sound, music sound, voice, etc.

Recently, multi-channel algorithms are used for two or more microphones. For example, a beamforming algorithm using a time difference of arrival (TDOA) of sound at each microphone provides more speaker-focused call quality to users. However, the existing systems for improving the sound quality of a video call cannot select a speaker or a region of a counterpart desired by a near-end speaker or a far-end speaker.

SUMMARY OF THE INVENTION

Accordingly, one aspect of present disclosure is to address the above and other related art problems.

Another aspect of the present disclosure is to provide a system for improving the sound quality of a video conference call.

Still another aspect of the present disclosure is to provide a system for actively solving a passive problem of determining a speaker or a region to be voice-focused in an existing video conferencing system.

Yet another object of the present disclosure is to provide a more focused call quality to a speaker when a user zooms in and out of a screen of a counterpart through the use of a multi-microphone and selects a desired region according to a speaker selection.

To achieve these and other advantages and in accordance with the purpose of the present invention, as embodied and broadly described herein, a far-end terminal including a communication interface configured to perform wireless communication with a near-end terminal; a display configured to display a near-end image received from the near-end terminal and a speaker image including a plurality of speakers captured through a camera; and a processor configured to receive focusing mode setting information and speaker focus information from the near-end terminal; when an operation mode of the near-end terminal is determined as being set to a wide focusing mode based on the focusing mode setting information, obtain an angle range corresponding to a specific region included in the speaker focus information; perform beamforming on a voice signal by using the obtained angle range; and transmit audio, which is a result of performing the beamforming, to the near-end terminal.

The present disclosure also provides a voice focusing method of a far-end terminal including displaying a near-end image received from a near-end device and a speaker image including a plurality of speakers captured through a camera; receiving focusing mode setting information and speaker focus information from the near-end terminal; when an operation mode of the near-end terminal is determined as being set to a wide focusing mode based on the focusing mode setting information, obtaining an angle range corresponding to a specific region included in the speaker focus information; and performing beamforming on a voice signal by using the obtained angle range, and transmit audio, which is a result of performing the beamforming, to the near-end terminal.

Advantageous Effects

According to an embodiment of the present disclosure, high call quality is provided when users use a video conferencing system. In addition, because a user can select a voice the user wants to hear or send, the needs of users commonly encountered in a video conference can be addressed.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is a view illustrating a video conferencing system according to an embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component. When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

The artificial intelligence device described therein includes a mobile phone, a smartphone, a laptop computer, an artificial intelligence device for digital broadcasting, personal digital assistants (PDA), a portable multimedia player (PMP), a navigation system, and a slate PC, a tablet PC, a ultrabook, a wearable device (e.g., watch-type artificial intelligence device (smartwatch), glass-type artificial intelligence device (smart glass), HMD (head mounted) display)).

However, the artificial intelligence device 10 according to the embodiment described herein may also be applied to fixed artificial intelligence devices such as a smart TV, a desktop computer, a digital signage, a refrigerator, a washing machine, an air conditioner, a dishwasher, and the like. In addition, the artificial intelligence device 10 according to an embodiment of the present disclosure is applicable to a fixed or movable robot. The artificial intelligence device 10 according to an embodiment of the present disclosure can also perform a function of a voice agent. The voice agent may be a program that recognizes a user's voice and outputs a response suitable for the recognized user's voice as a voice.

Figure 1:
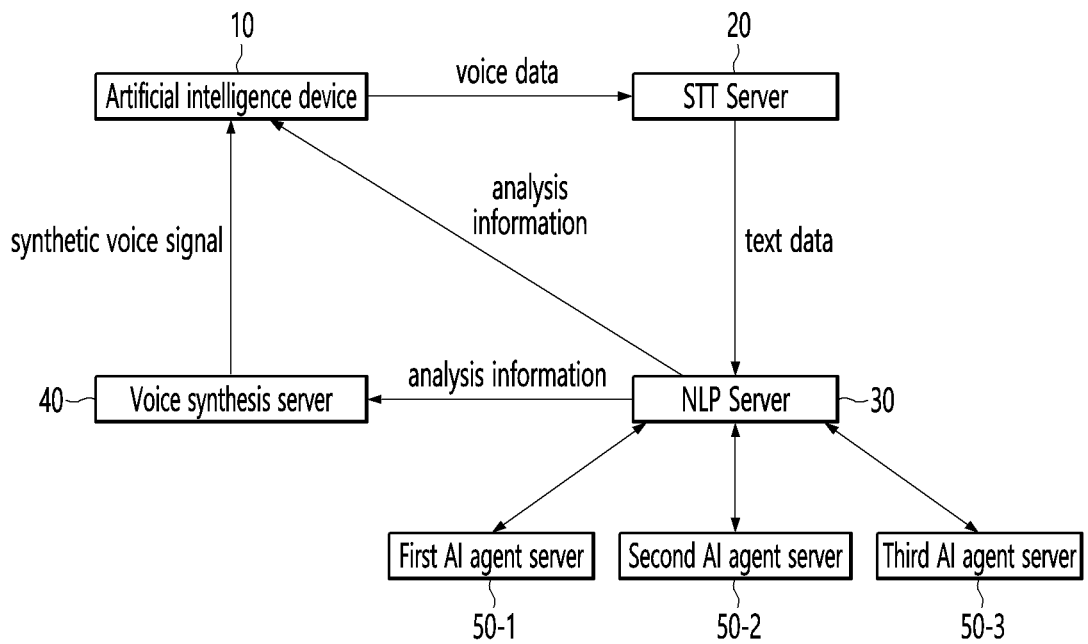
FIG. 1 is a diagram illustrating a voice system according to an embodiment of the present disclosure.

FIG. 1 is a diagram illustrating a voice system according to an embodiment of the present disclosure. A general voice recognition and synthesis process includes converting voice data of a speaker into text data, analyzing the intention of the speaker based on the converted text data, converting text data corresponding to the analyzed intention into synthetic voice data, and outputting the converted synthetic voice data. For a voice recognition and synthesis process, the voice recognition system shown in FIG. 1 can be used.

Referring to FIG. 1, the voice recognition system 1 includes an artificial intelligence device 10, a speech-to-text (STT) server 20, a natural language processing (NLP) server 30 and a voice synthesis server 40 and a plurality of AI agent servers 50-1 to 50-3. The artificial intelligence device 10 can transmit a voice signal corresponding to a speaker's voice received through a microphone 122 to the STT server 210.

Further, the STT server 20 can convert the voice data received from the artificial intelligence device 10 into text data and increase accuracy of speech-text conversion using a language model. The language model can calculate the probability of a sentence or calculating the probability that the next word will appear when previous words are given. For example, the language model may include probabilistic language models such as a Unigram model, a Bigram model, an N-gram model, and the like.

The Unigram model assumes that the use of all words is completely independent of each other and calculates the probability of a sequence of words as the product of the probabilities of each word. The Bigram model assumes that the use of words depends only on one previous word. Further, the N-gram model assumes that the use of words depends on previous (n−1) words. Thus the STT server 20 can determine whether text data converted from voice data is properly converted using a language model, thereby increasing the accuracy of the conversion into the text data.

In addition, the NLP server 230 receives text data from the STT server 20. The STT server 20 can be included in the NLP server 30 and the NLP server 30 can perform intention analysis on the text data based on the received text data. Further, the NLP server 30 can transmit intention analysis information indicating the result of performing intention analysis to the artificial intelligence device 10.

As another example, the NLP server 30 can transmit the intention analysis information to the voice synthesis server 40. The voice synthesis server 40 can then generate a synthetic voice based on the intention analysis information and transmit the generated synthetic voice to the artificial intelligence device 10.

In addition, the NLP server 30 can sequentially perform a morpheme analysis step, a syntax analysis step, a speech act analysis step and a conversation processing step, thereby generating the intention analysis information. In particular, the morpheme analysis step classifies text data corresponding to a voice uttered by a user into morpheme units, which are the smallest units with meaning, and determines which part of speech each classified morpheme has.

Also, the syntax analysis step classifies text data into noun phrases, verb phrases, adjective phrases, etc., using the result of the morpheme analysis step, and determines what kind of relationship exists between the classified phrases. Through the syntax analysis step, the subject, object, and modifier of the voice uttered by the user can be determined.

Further, the speech act analysis step analyzes the intention of the voice uttered by the user using the result of the syntax analysis step. Specifically, the speech act analysis step determines the intention of the sentence, such as whether the user asks a question, makes a request, or expresses a simple emotion. The conversation processing step determines whether to answer the user's utterance, to respond to the user's utterance, or to ask a question for inquiring additional information, using the result of the speech act analysis step.

In addition, the NLP server 30 can generate intention analysis information including one or more of an answer to the intention uttered by the user, a response, and an inquiry for additional information, after the conversation processing step. The NLP server 30 can transmit a search request to a search server (not shown) and receive search information corresponding to the search request, in order to search for information matching the user's utterance intention.

When the user's utterance intention is to search for content, the search information may include information on the searched content. The NLP server 30 can transmit the search information to the artificial intelligence device 10, and the artificial intelligence device 10 can output the search information.

Meanwhile, the NLP server 30 can receive the text data from the artificial intelligence device 10. For example, when the artificial intelligence device 10 supports a speech-to-text function, the artificial intelligence device 10 can convert voice data into text data, and transmit the converted text data to the NLP server 30. The voice synthesis server 40 can also generate a synthetic voice by combining pre-stored voice data, record the voice of a person selected as a model and divide the recorded voice into syllable or word units.

Further, the voice synthesis server 40 can store the divided voice in syllable or word units in an internal or external database. The voice synthesis server 40 can also search a database for a syllable or word corresponding to the given text data, and synthesize a combination of the searched syllables or words to generate a synthetic voice. Further, the voice synthesis server 40 can store a plurality of voice language groups corresponding to a plurality of languages. For example, the voice synthesis server 40 may include a first voice language group recorded in Korean and a second voice language group recorded in English.

The voice synthesis server 40 can also translate text data of a first language into text of a second language, and generate a synthetic voice corresponding to the translated text of the second language by using the second voice language group. The voice synthesis server 40 can then transmit the generated synthetic voice to the artificial intelligence device 10.

Further, the voice synthesis server 40 can receive analysis information from the NLP server 30. The analysis information may include information obtained by analyzing the intention of the voice uttered by the user. The voice synthesis server 40 can then generate a synthetic voice reflecting the user's intention based on the analysis information.

In an embodiment, the STT server 20, the NLP server 30 and the voice synthesis server 40 can be implemented as one server. The functions of the STT server 20, the NLP server 30 and the voice synthesis server 40 described above can also be performed in the artificial intelligence device 10. To this end, the artificial intelligence device 10 can include one or more processors.

Each of the plurality of AI agent servers 50-1 to 50-3 can transmit search information to the NLP server 30 or the artificial intelligence device 10 according to the request of the NLP server 30. When the intention analysis result of the NLP server 30 is a content search request, the NLP server 30 transmits a content search request to one or more of the plurality of AI agent servers 50-1 to 50-3, and receive the content search result from the corresponding server. The NLP server 30 can also transmit the received search result to the artificial intelligence device 10.

Figure 2:
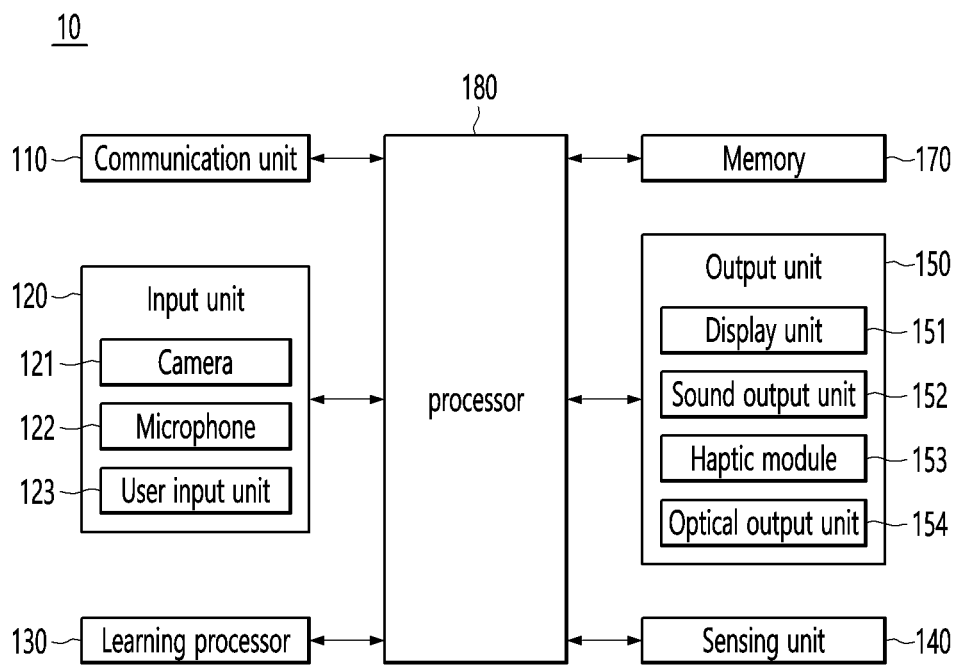
FIG. 2 is a block diagram illustrating a configuration of an artificial intelligence device according to an embodiment of the present disclosure.

Next, FIG. 2 is a block diagram illustrating a configuration of an artificial intelligence device according to an embodiment of the present disclosure. Referring to FIG. 2, the artificial intelligence device 10 may include a communication unit 110, an input unit 120, a learning processor 130, a sensing unit 140, an output unit 150, a memory 170 and a processor 180.

The communication unit 110 can transmit/receive data to/from external devices using wired/wireless communication technology. For example, the communication unit 110 can transmit/receive sensor information, user input, learning models, control signals, etc. to/from the external devices. In this instance, the communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), etc.

The input unit 120 can obtain various types of data and can include a camera for inputting a video signal, a microphone for receiving an audio signal, a user input unit for receiving information from a user, and the like. Here, by treating the camera or the microphone as a sensor, a signal obtained from the camera or the microphone can be referred to as sensing data or sensor information.

Further, the input unit 120 can acquire learning data for model training and input data to be used when acquiring an output using the learning model. The input unit 120 can also acquire raw input data, and, in this instance, the processor 180 or the learning processor 130 can extract an input feature by preprocessing the input data. As shown in FIG. 2, the input unit 120 can also include a camera 121 for inputting a video signal, a microphone 122 for receiving an audio signal and a user input unit 123 for receiving information from a user.

Audio data or image data collected by the input unit 120 can be analyzed and processed as a user's control command. Further, the input unit 120 inputs image information (or signal), audio information (or signal), data, or information input from a user. For inputting image information, the artificial intelligence device 10 can include one or a plurality of cameras 121.

In addition, the camera 121 processes an image frame such as a still image or a moving image obtained by an image sensor in a video call mode or a shooting mode. The processed image frame can then be displayed on the display unit 151 or stored in the memory 170. Further, the microphone 122 processes external sound signals into electrical voice data, and the processed voice data can be utilized in various ways depending on the function (or running application program) being performed by the artificial intelligence device 10. Various noise removal algorithms for removing noise generated in the process of receiving an external sound signal can also be applied to the microphone 122.

Further, the user input unit 123 receives information from a user, and when information is input through the user input unit 123, the processor 180 can control the operation of the artificial intelligence device 10 to correspond to the input information. The user input unit 123 may also include a mechanical input unit (or a mechanical key, for example, a button located on the front/rear surface or side surface of the terminal 100, a dome switch, a jog wheel, a jog switch, etc.) and a touch input unit. As an example, the touch input unit includes a virtual key, a soft key, or a visual key displayed on a touchscreen through software processing or a touch key disposed on a portion other than the touchscreen.

In addition, the learning processor 130 can train a model composed of an artificial neural network using learning data. Here, the learned artificial neural network can be referred to as a learning model. The learning model is used to infer a result value with respect to new input data other than the learning data, and the inferred value can be used as a basis for a decision to perform a certain operation.

The learning processor 130 can also include a memory integrated or implemented in the artificial intelligence device 10. Alternatively, the learning processor 130 can be implemented using the memory 170, an external memory directly coupled to the artificial intelligence device 10, or a memory maintained in an external device.

Further, the sensing unit 140 can acquire at least one of internal information of the artificial intelligence device 10, surrounding environment information of the artificial intelligence device 10, and user information, using various sensors. Also, sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, radar, etc.

The output unit 150 can generate video, audio or tactile output and shown in FIG. 2 can include at least one of a display unit 151, a sound output unit 152, a haptic module 153 or an optical output unit 154. The display unit 151 displays (outputs) information processed by the artificial intelligence device 10. For example, the display unit 151 can display information on an execution screen of an application program driven by the artificial intelligence device 10, or user interface (UI) and graphic user interface (GUI) information according to the information on the execution screen.

The display unit 151 can also have an inter-layered structure or an integrated structure with a touch sensor in order to form a touchscreen. The touchscreen can provide an output interface between the mobile terminal 100 and a user, as well as function as the user input unit 123 which provides an input interface between the mobile terminal 100 and the user.

In addition, the sound output unit 152 outputs audio data received from the communication unit 110 or stored in the memory 170 in a call signal reception mode, a call mode, a record mode, a voice recognition mode, a broadcast reception mode, and the like. The sound output unit 152 can also include at least one of a receiver, a speaker or a buzzer.

Further, the haptic module 153 generates various tactile effects that a user feels. A typical example of a tactile effect generated by the haptic module 153 is vibration. Also, the optical output unit 154 outputs a signal for indicating event generation using light of a light source of the artificial intelligence device 10. Examples of events generated in the artificial intelligence device 10 include message reception, call signal reception, a missed call, an alarm, a schedule notice, email reception, information reception through an application, and the like.

Further, the memory 170 can store data to support various functions of the artificial intelligence device 10. For example, the memory 170 can store input data, learning data, a learning model, a learning history, etc. obtained by the input unit 120. The processor 180 also can determine at least one executable operation of the artificial intelligence device 10 based on information determined or generated using a data analysis algorithm or a machine learning algorithm. In addition, the processor 180 can control the components of the artificial intelligence device 10 to perform the determined operation.

The processor 180 can request, retrieve, receive, or utilize data of the learning processor 130 or the memory 170, and control the components of the artificial intelligence device 10 to perform predicted operation or desirable operation of the at least one executable operations. When connection of an external device is required to perform the determined operation, the processor 180 can generate a control signal for controlling the corresponding external device and transmit the generated control signal to the corresponding external device.

In addition, the processor 180 can obtain intention information with respect to user input, and determine a user's requirement based on the obtained intention information. The processor 180 can also obtain intention information corresponding to the user input, using at least one of a speech to text (STT) engine for converting voice input into a character string or a natural language processing (NLP) engine for obtaining intention information of a natural language.

At least one of the STT engine or the NLP engine can be composed of an artificial neural network trained according to a machine learning algorithm. In addition, at least one of the STT engine or the NLP engine can be trained by a learning processor 130, trained by a learning processor 240 of an AI server 200, or trained by distributed processing thereof.

Further, the processor 180 can collect history information including user feedback on the operation content or operation of the artificial intelligence device 10 and store it in the memory 170 or the learning processor 130 or transmit it to an external device such as the AI server 200. The collected historical information can then be used to update the learning model.

The processor 180 can control at least some of the components of the artificial intelligence device 10 to drive an application program stored in the memory 170. Furthermore, the processor 180 can operate by combining two or more of the components included in the artificial intelligence device 10 to drive the application program.

Figure 3A:
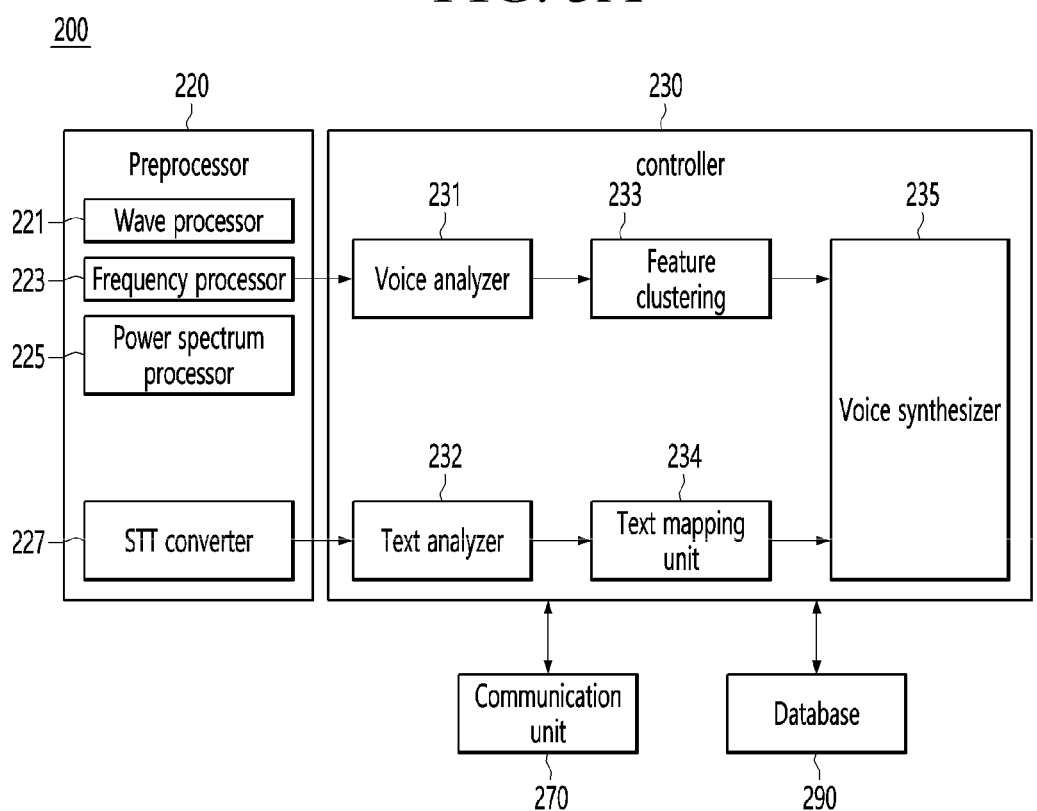
FIG. 3A is a block diagram illustrating a configuration of a voice service server according to an embodiment of the present disclosure.

Next FIG. 3A is a block diagram illustrating a configuration of a voice service server according to an embodiment of the present disclosure. The voice service server 200 can include one or more of the STT server 20, the NLP server 30 and the voice synthesis server 40 shown in FIG. 1. The voice service server 200 can also be named a server system.

Referring to FIG. 3A, the voice service server 200 can include a preprocessor 220, a controller 230, a communication unit 270 and a database 290. In addition, the preprocessor 220 can preprocess the voice received through the communication unit 270 or the voice stored in the database 290.

The preprocessor 220 can also be implemented as a chip separate from the controller 230 or may be implemented as a chip included in the controller 230. The preprocessor 220 can receive a voice signal (uttered by the user) and filter out a noise signal from the voice signal before converting the received voice signal into text data.

When the preprocessor 220 is provided in the artificial intelligence device 10, it is possible to recognize a start word for activating voice recognition of the artificial intelligence device 10. The preprocessor 220 can convert the start word received through the microphone 122 into text data, and determine that the start word has been recognized when the converted text data is text data corresponding to a pre-stored start word.

In addition, the preprocessor 220 can convert the voice signal, from which noise is removed, into a power spectrum. The power spectrum is a parameter indicating which frequency component is included in the waveform of the temporally varying voice signal with what size. Further, the power spectrum shows the distribution of the squared value of the amplitude according to the frequency of the waveform of the voice signal. This will now be described with reference to FIG. 3B.

Figure 3B:
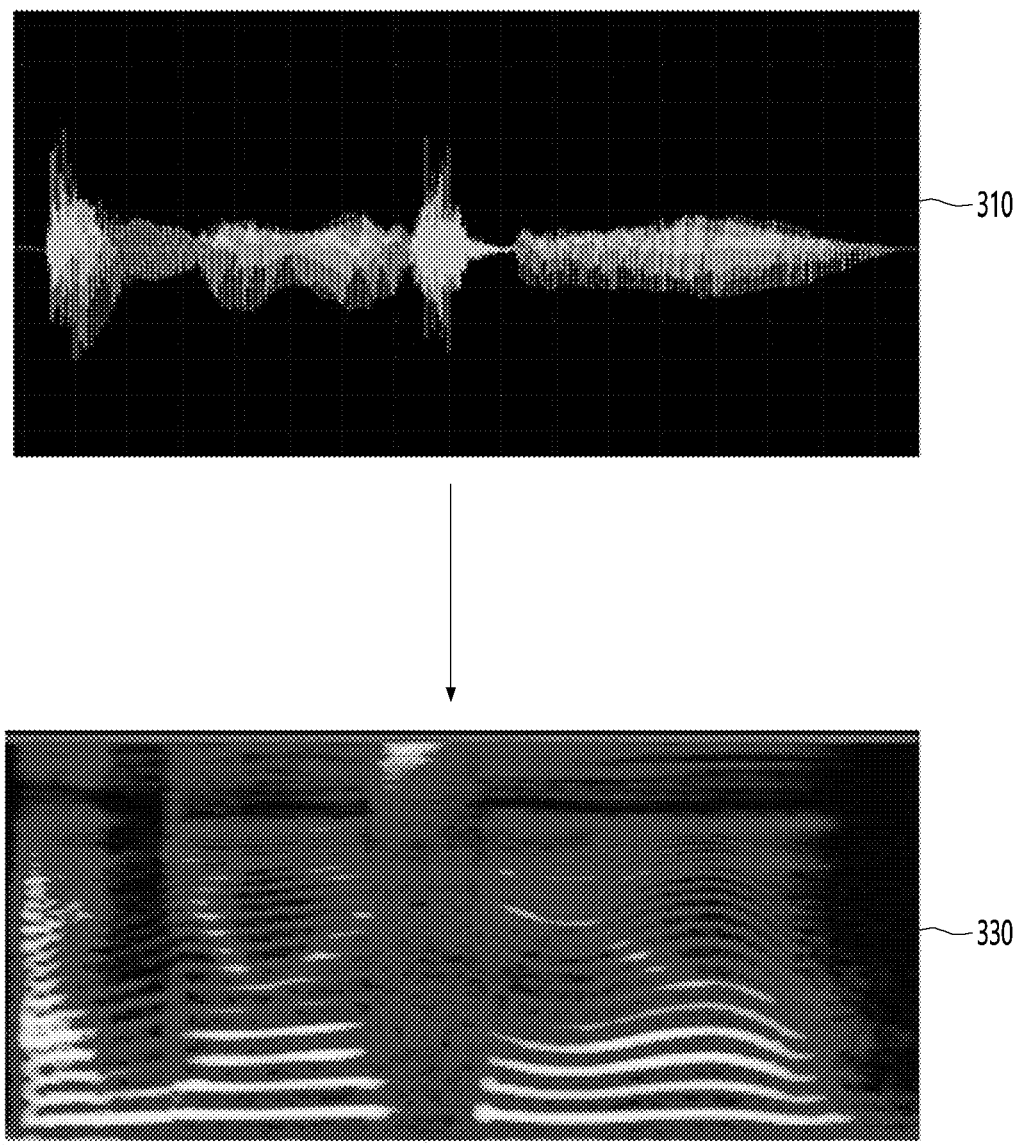
FIG. 3B is a view illustrating an example of converting a voice signal into a power spectrum according to an embodiment of the present disclosure.

In particular, FIG. 3B is a view illustrating an example of converting a voice signal into a power spectrum according to an embodiment of the present disclosure. Referring to FIG. 3B, a voice signal 310 is shown. The voice signal 310 can be received from an external device or be a signal previously stored in the memory 170. The x-axis of the voice signal 310 can represent time, and the y-axis thereof can represent the magnitude of the amplitude.

The power spectrum processor 225 can convert the audio signal 310 having an x-axis as a time axis into a power spectrum 330 having an x-axis as a frequency axis. The power spectrum processor 225 can convert the voice signal 310 into the power spectrum 330 using Fast Fourier Transform (FFT). The x-axis of the power spectrum 330 represents the frequency, and the y-axis thereof represents the squared value of the amplitude.

FIG. 3A will be described again. The functions of the preprocessor 220 and the controller 230 described in FIG. 3A can be performed even in the NLP server 30. As shown in FIG. 3A, the preprocessor 220 can include a wave processor 221, a frequency processor 223, the power spectrum processor 225, and a speech to text (STT) converter 227.

The wave processor 221 can extract the waveform of the voice, and the frequency processor 223 can extract a frequency band of the voice. The power spectrum processor 225 can extract the power spectrum of the voice. In particular, the power spectrum can be a parameter indicating which frequency component is included in the waveform of the temporally varying voice signal with what size.

Further, the speech-to-text (STT) converter 227 can convert speech into text. For example, the speech-to-text (STT) converter 227 can convert the speech of a specific language into text of the corresponding language. The controller 230 can control the overall operation of the voice service server 200, and as shown can include a voice analyzer 231, a text analyzer 232, a feature clustering unit 233, a text mapping unit 234 and a voice synthesizer 235.

The voice analyzer 231 can extract characteristic information of the voice using one or more of the waveform of the voice, the frequency band of the voice, and the power spectrum of the voice, which are preprocessed by the preprocessor 220. The characteristic information of the voice can include one or more of speaker's gender information, speaker's voice (or tone), a pitch, a speaker's speaking way, a speaker's utterance speed, and a speaker's emotion.

In addition, the characteristic information of the voice can further include the tone of the speaker. Also, the text analyzer 232 can extract main expression phrases from text converted by the speech-to-text converter 227. When a change in tone between a phrase and a phrase from the converted text is detected, the text analyzer 232 can extract a phrase with a changed tone as a main expression phrase.

Further, the text analyzer 232 can determine that the tone has been changed, when the frequency band between the phrase and the phrase is changed by more than a preset band. The text analyzer 232 can extract key words from phrases of the converted text. The main word may be a noun present in a phrase, but this is only an example.

The feature clustering unit 233 can classify the speaker's utterance type using the characteristic information of the voice extracted by the voice analyzer 231. Also, the feature clustering unit 233 can classify the speaker's utterance type by giving weight to each of the type items constituting the characteristic information of the voice.

The feature clustering unit 233 can also classify the speaker's utterance type using an attention technique of the deep learning model. Further, the text mapping unit 234 can translate text converted into a first language into text of a second language and can map the text translated into the second language with the text of the first language.

In addition, the text mapping unit 234 can map the main expression phrases constituting the text of the first language to the phrases of the second language corresponding thereto. The text mapping unit 234 can also map the utterance type corresponding to the main expression phrase constituting the text of the first language to the phrase of the second language. This is to apply the classified utterance type to the phrase of the second language.

Further, the voice synthesizer 235 can generate a synthetic voice, by applying the utterance type and the speaker's tone classified by the feature clustering unit 233 to the main expression phrase of the text translated into the second language by the text mapping unit 234. The controller 230 can then determine the user's utterance feature using one or more of the transmitted text data or power spectrum 330.

The user's utterance feature can include a user's gender, a user's pitch, a user's tone, a user's utterance topic, a user's utterance speed, and a user's volume. The controller 230 can also obtain a frequency of the voice signal 310 and an amplitude corresponding to the frequency, using the power spectrum 330.

In addition, the controller 230 can determine the gender of the user who uttered the voice, using the frequency band of the power spectrum 330. For example, when the frequency band of the power spectrum 330 is within a preset first frequency band range, the controller 230 can determine the gender of the user as a male.

When the frequency band of the power spectrum 330 is within a preset second frequency band range, the controller 230 can determine the user's gender as a female. Here, the second frequency band range can be larger than the first frequency band range. The controller 230 can also determine the pitch of the voice using the frequency band of the power spectrum 330. For example, the controller 230 can determine the degree of pitch of the sound according to the magnitude of the amplitude within a specific frequency band range.

Further, the controller 230 can determine the user's tone by using the frequency band of the power spectrum 330. For example, the controller 230 can determine, among the frequency bands of the power spectrum 330, a frequency band having an amplitude magnitude greater than or equal to a certain magnitude as a user's main sound range, and determine the determined main sound range as the user's tone.

The controller 230 can also determine the user's utterance speed from the converted text data, through the number of syllables uttered per unit time. In particular, the controller 230 can determine the user's utterance topic using the Bag-Of-Word Model technique, for the converted text data. In more detail, the Bag-Of-Word Model technique is for extracting mainly used words based on the frequency of words in a sentence. Specifically, the Bag-Of-Word Model technique is for extracting a unique word from a sentence, expressing the frequency of each extracted word as a vector, and determining the utterance topic as the feature.

For example, when words such as <running> and <stamina> frequently appear in the text data, the controller 230 can classify the user's utterance topic as exercise. The controller 230 can also determine the user's utterance topic from the text data using a known text categorization technique, and extract a keyword from the text data and determine the user's utterance topic.

Further, the controller 230 can determine the user's voice volume in consideration of the amplitude information in the entire frequency band. For example, the controller 230 can determine the user's voice volume based on an average or a weighted average of amplitudes in each frequency band of the power spectrum.

In addition, the communication unit 270 can perform communication with an external server by wire or wirelessly. Also, the database 290 can store the voice of the first language included in the content, and also store a synthetic voice in which the voice of the first language is converted into the voice of the second language.

Further, the database 290 can store the first text corresponding to the voice of the first language and the second text in which the first text is translated into the second language, and store various learning models required for speech recognition.

Meanwhile, the processor 180 of the artificial intelligence device 10 shown in FIG. 2 can include the preprocessor 220 and the controller 230 shown in FIG. 3. That is, the processor 180 of the artificial intelligence device 10 can also perform the functions of the preprocessor 220 and the function of the controller 230.

Figure 4:
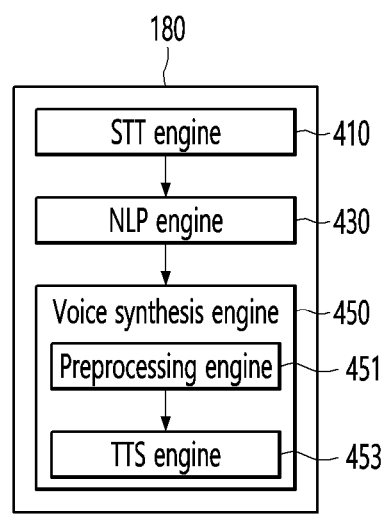
FIG. 4 is a block diagram illustrating a configuration of a processor for voice recognition and synthesis of an artificial intelligence device according to an embodiment of the present disclosure.

Next, FIG. 4 is a block diagram illustrating a configuration of a processor for voice recognition and synthesis of an artificial intelligence device according to an embodiment of the present disclosure. That is, the voice recognition and synthesis process of FIG. 4 can be performed by the learning processor 130 or the processor 180 of the artificial intelligence device 10 without using a server.

Referring to FIG. 4, the processor 180 of the artificial intelligence device 10 can include an STT engine 410, an NLP engine 430, and a voice synthesis engine 450. Each engine may be one of hardware or software. The STT engine 410 can perform the function of the STT server 20 of FIG. 1. That is, the STT engine 410 can convert voice data into text data, and the NLP engine 430 can perform the function of the NLP server 30 of FIG. 2A. That is, the NLP engine 430 can obtain intention analysis information indicating the intention of the speaker from the converted text data.

In addition, the voice synthesis engine 450 can perform the function of the voice synthesis server 40 of FIG. 1. The voice synthesis engine 450 can search a database for a syllable or word corresponding to the given text data, and synthesize a combination of the searched syllables or words, thereby generating a synthetic speech.

The voice synthesis engine 450 can also include a pre-processing engine 451 and a TTS engine 453. In particular, the pre-processing engine 451 can pre-process text data before generating the synthetic voice. Specifically, the pre-processing engine 451 performs tokenization for dividing the text data into tokens which are significant units.

After tokenization, the pre-processing engine 451 can perform cleansing operation of removing unnecessary characters and symbols, in order to remove noise. Thereafter, the pre-processing engine 451 can generate the same word token by integrating word tokens having different expression methods. Then, the pre-processing engine 451 can remove insignificant word tokens (stopwords). The TTS engine 453 can then synthesize a voice corresponding to the pre-processed text data and generate a synthetic voice.

Next, FIG. 5 is a view illustrating a video conferencing system 5 according to an embodiment of the present disclosure. As shown, the video conferencing system 5 includes a first terminal 100-1 and a second terminal 100-2, which are examples of the artificial intelligence device 10 of FIG. 2. That is, each of the first terminal 100-1 and the second terminal 100-2 include the components of the artificial intelligence device 10 of FIG. 2.

As shown in FIG. 5, the first terminal 100-1 is a near-end device located close to the user, and the second terminal 100-2 is a far-end device located farther from the user. The video conferencing system 5 may further include a server for utilizing an application that provides a video conferencing service.

As shown, the first terminal 100-1 displays a first image 510 including a user image 511 corresponding to the user and a far-end image 513 corresponding to a plurality of counterparts. The first terminal 100-1 can obtain the user image 511 captured through a camera of the first terminal 100-1 or a camera connected to the first terminal 100-1.

In addition, the far-end image 513 corresponding to the plurality of counterparts (or the plurality of speakers A, B, and C) can be an image received from the second terminal 100-2 or the first and second terminals 100-1 and 100-2. The second terminal 100-2 also displays a second image 530 including a speaker image 531 corresponding to the plurality of counterparts (or the plurality of speakers A, B, and C) and a near-end image 533 corresponding to the user of the first terminal 100-1.

Figure 6:
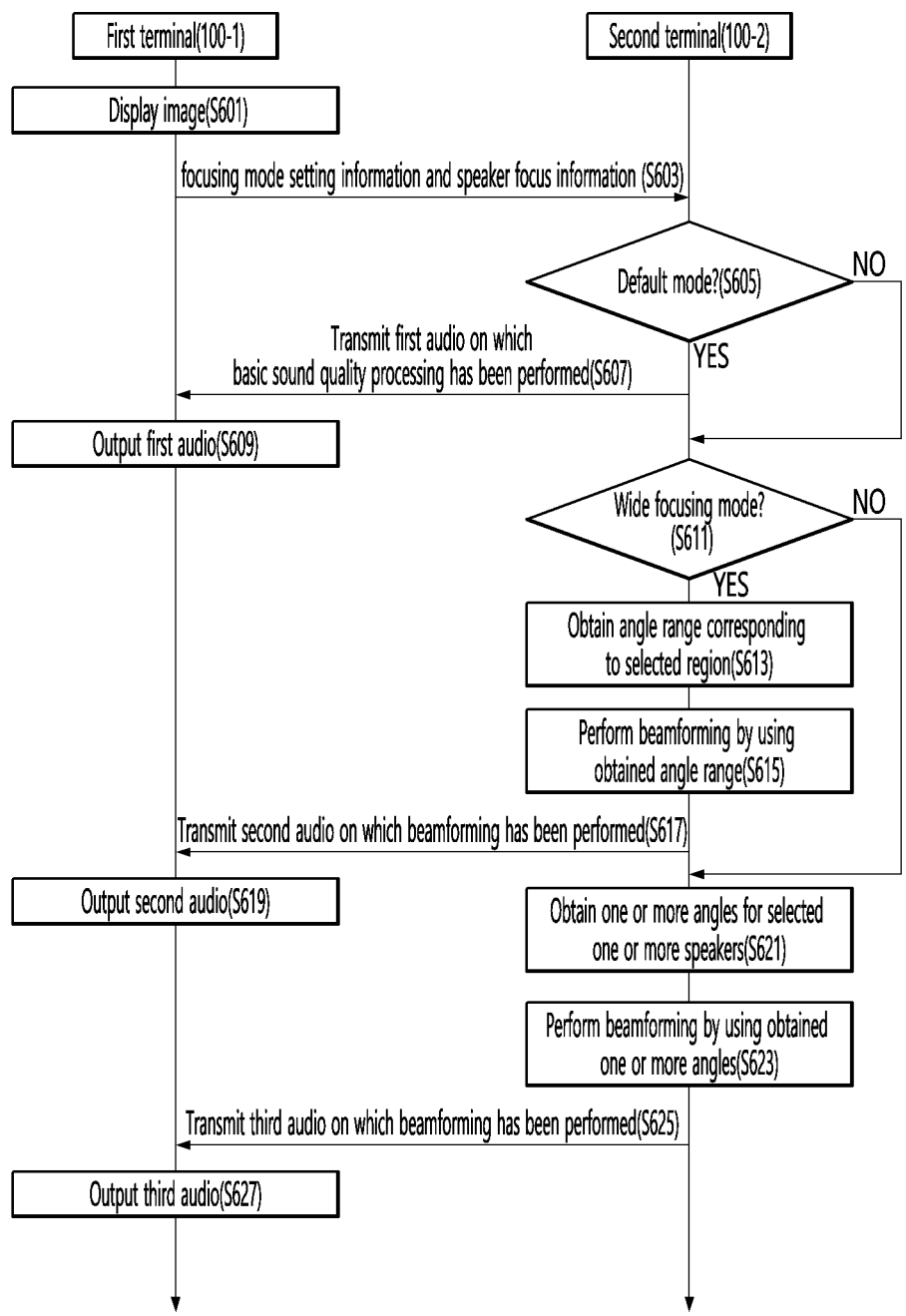
FIG. 6 is a flowchart illustrating a voice focusing method of a video conferencing system according to an embodiment of the present disclosure.

Next, FIG. 6 is a flowchart illustrating a voice focusing method of a video conferencing system according to an embodiment of the present disclosure. Hereinafter, the embodiment of FIG. 6 will be described in connection with the embodiment of FIG. 5. In addition, a processor 180-1 of the first terminal 100-1 can perform the function of the processor 180 shown in FIG. 2, a communication unit 110-1 can perform the function of the communication unit 110 shown in FIG. 2, and a display unit 151-1 can perform the function of the display unit 151 illustrated in FIG. 2. An image displayed on the display unit 151-1 can be the first image 510 shown in FIG. 5.

Also, a processor 180-2 of the second terminal 100-2 can perform the function of the processor 180 shown in FIG. 2, a communication unit 110-2 can perform the function of the communication unit 110 shown in FIG. 2, and a display unit 151-2 can perform the function of the display unit 151 illustrated in FIG. 2. Hereinafter, the communication unit can be referred to as a communication interface, and the display unit can be referred to as a display.

Referring to FIG. 6, the processor 180-1 of the first terminal 100-1 displays an image on the display unit 151-1 (S601) and transmits focusing mode setting information and speaker focus information to the second terminal 100-2 through the communication unit 110-1 (S603). According to an embodiment, the focusing mode setting information can include information about a mode set by the user of the first terminal 100-1 among a plurality of focusing modes. The plurality of focusing modes include a default mode, a wide focusing mode, and a narrow focusing mode, for example.

In particular, the default mode corresponds to an executed basic algorithm for basic sound quality processing without focusing on an input voice. For example, the basic sound quality processing can include applying one or more of an Acoustic Echo Cancellation (AEC) algorithm or a known Noise Reduction (NR) algorithm. The AEC algorithm is used for removing an echo signal by comparing the echo signal received through a speaker with a voice signal received through a microphone.

In addition, the wide focusing mode allows a near-end user, that is, the user of the first terminal 100-1 to focus a voice uttered in a specific region on a far-end preview screen (the first image 510 in FIG. 5). Also, the narrow focusing mode allows the user of the first terminal 100-1 to focus a voice uttered by a single speaker or a plurality of speakers on a far-end preview screen. The focusing mode setting information includes the focusing mode set by the first terminal 100-1 or the user of the first terminal 100-1.

In an embodiment, when the narrow focusing mode is selected as the focusing mode, the speaker focus information can include information about which speaker is selected. In this instance, the speaker focus information can include coordinate information of the selected speaker. In another embodiment, when the wide focusing mode is selected, the speaker focus information indicate which region is selected on the far-end preview screen. In this instance, the speaker focus information can include coordinate information of the selected region. Also, the processing of audio transmitted from the second terminal 100-2 to the first terminal 100-1 can change according to the focusing mode.

Further, the processor 180-2 of the second terminal 100-2 determines whether the focusing mode of the first terminal 100-1 is the default mode, based on the focusing mode setting information (S605). When the processor 180-2 of the second terminal 100-2 determines the first terminal 100-1 is set to the default mode (Yes in S605), the processor 180-2 of the second terminal 100-2 transmits a first audio, on which basic sound quality processing has been performed, to the first terminal 100-1 through the communication unit 110-1 (S607), and the processor 180-1 of the first terminal 100-1 outputs the first audio (S609).

As described above, the basic sound quality processing can include AEC algorithm processing for audio input through the microphone. Further, the processor 180-1 can output the first audio through the sound output unit 152 provided in the first terminal 100-1 or a speaker connected to the first terminal 100-1.

When the processor 180-2 of the second terminal 100-2 determines the first terminal 100-1 is set to the wide focusing mode (Yes in S611), the processor 180-2 of the second terminal 100-2 obtains an angle range corresponding to the region selected by the user of the first terminal 100-1 based on the speaker focus information (S613). When the focusing mode is the wide focusing mode, the speaker focus information can include information about a specific region selected by the user among the entire region of the far-end image 513 of FIG. 5.

Figure 7:
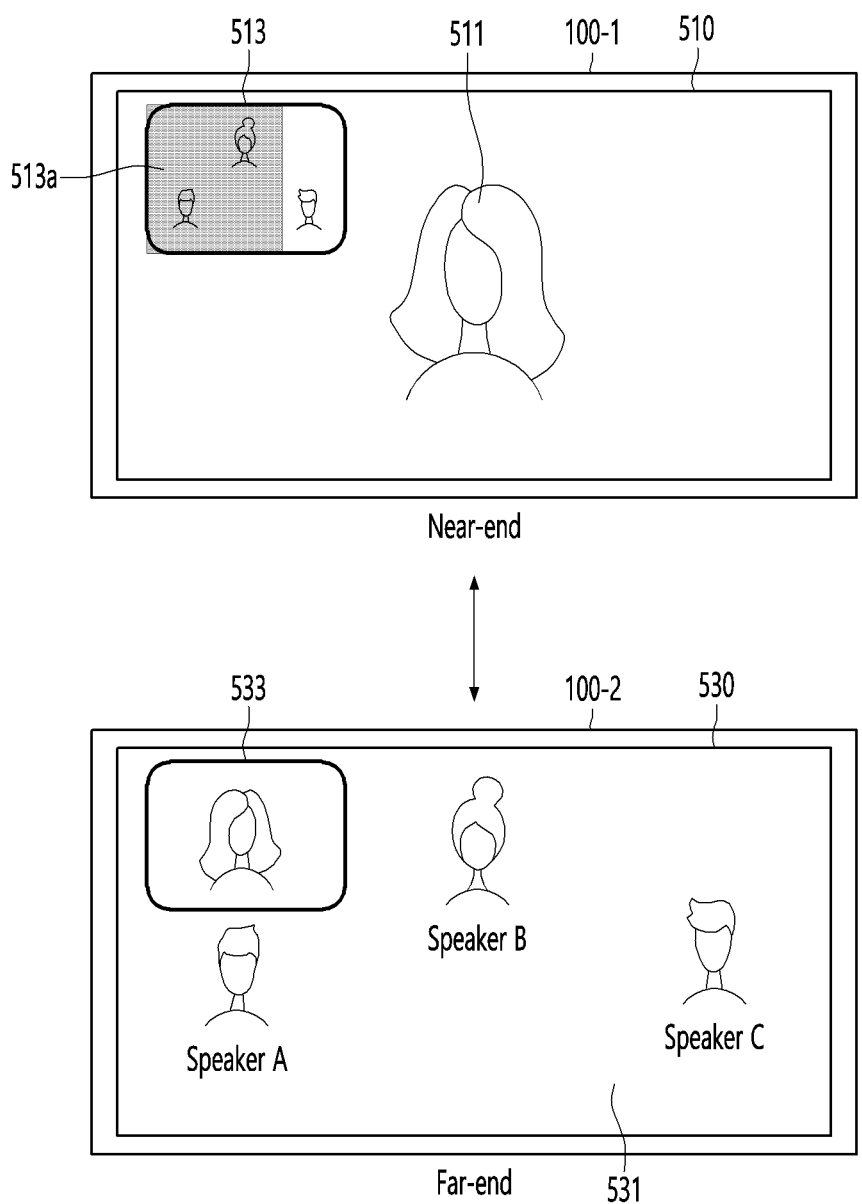
FIG. 7 is a view illustrating an example in which a specific region is selected from a far-end image when a focusing mode is a wide focusing mode, according to an embodiment of the present disclosure.

This is described with reference to FIG. 7. In particular, FIG. 7 is a view illustrating an example in which a specific region is selected from a far-end image when the focusing mode is the wide focusing mode, according to an embodiment of the present disclosure. Referring to FIG. 7, a user of a first terminal 100-1 selects a specific region 513a among the entire region of a far-end image 513. Information about the selected specific region 513a can include coordinate information of the specific region 513a. For example, when the specific region 513a has a rectangular shape, the coordinate information of the specific region 513a can include coordinates of the four vertices of the rectangle.

In addition, the user of the first terminal 100-1 can designate the specific region 513a in order to hear a voice from a position corresponding to the specific region 513a louder than other positions in the far-end image 513 through a touch input. As shown in FIG. 7, the specific region 513a can include speakers A and B located at the far end terminal 100-2.

FIG. 6 is described again. A processor 180-2 of a second terminal 100-2 can obtain an angle range based on the coordinate information of the specific region 513a included in the speaker focus information. The coordinate information of the specific region 513a may include coordinates of the speakers.

The processor 180-2 of the second terminal 100-2 can obtain a first angle between the reference microphone and the speaker A included in the specific region 513a and a second angle between the reference microphone and the speaker B included in the specific region 513a. The reference microphone can be provided for measuring an angle between the speaker and the microphone, and includes a microphone disposed in front of the center of the second terminal 100-2. However, this is only an example, and the position of the reference microphone can change according to user settings.

The processor 180-2 of the second terminal 100-2 can obtain a range between the first angle and the second angle as an angle range and perform beamforming using the obtained angle range for the input voice (S615). The processor 180-2 of the second terminal 100-2 can perform beamforming for reinforcing an incoming beam signal in the obtained angle range by reducing a gain of the input beam signal outside the obtained angle range among the entire angle range. This will be described below.

In particular, performing beamforming on a voice of a speaker in a conference call includes an audio focusing process. In particular, the far end terminal 100-2 can include, for example, a ring or circle of six or more microphones. Then, when a speaker speaks in the room having the far-end terminal 100-2, the location of the speaker can be determined by the ring of six microphones. For example, if a microphone on a left side of the ring of microphones has the largest input voice, the controller or processor can determine the user speaking is at the left side of the room. The controller or processor can then control a gain of the microphone(s) on the left side of the ring to increase so as to focus on the left region of the room.

In more detail, if the user at the near-end terminal 100-1 designates the region they are interested in hearing more clearly is at the left side or left region of the room at the far-end terminal 100-2, the controller or processor at the far-end terminal 100-2 can control the ring of microphones to increase a gain of sound in one or two microphones in the ring of microphones, for example, that are correspondingly located or pointed towards the left region of the room. Similarly, if the user at the near-end terminal 100-1 designated one or two counterpart speakers situated in the left side of the room of the far-end terminal 100-2, the controller or processor at the far-end terminal 100-2 can increase the gain of the microphones pointing towards the designated one or two counterpart speakers.

In addition, the ring of six microphones is only an example and there can be more or less microphones. However, a sufficient number of microphones is preferably provided so the room can be divided into multiple narrower regions. The multiple microphones can also be provided in an oval ring shape, square ring shape, etc. Further, using the multiple microphones, the entire region of the room at the far-end terminal 100-2 can be divided into narrower regions. Thus, according to an embodiment of the present disclosure, the processor or controller at the far-end terminal 100-2 can obtain an angle range corresponding to a narrower partial region of the entire region including the counterpart speakers at the far-end terminal, and perform selective audio focusing on a received voice within the obtained angle range to selectively increase a gain of the received voice and to selectively decrease a gain of other received voices outside the obtained angle range.

In addition, the processor 180-2 of the second terminal 100-2 transmits second audio, on which beamforming has been performed, to the first terminal 100-1 through the communication unit 110-2 (S617), and the processor 180-1 of the first terminal 100-1 outputs the received second audio (S619). The processor 180-1 can output the second audio through the sound output unit 152 provided in the first terminal 100-1, or output the second audio to a speaker connected to the first terminal 100-1.

When the processor 180-2 of the second terminal 100-2 determines the first terminal 100-1 is set to the narrow focusing mode (No in S611), the processor 180-2 of the second terminal 100-2 obtains one or more angles corresponding to one or more speakers selected by the user of the first terminal 100-1 based on the speaker focus information (S621).

When the first terminal 100-1 is set to the narrow focusing mode, the speaker focus information can include information indicating that one speaker is selected. In this instance, the speaker focus information can include coordinate information indicating the location of the selected speaker. In the narrow focusing mode, one speaker or a plurality of speakers can be selected.

Figure 8:
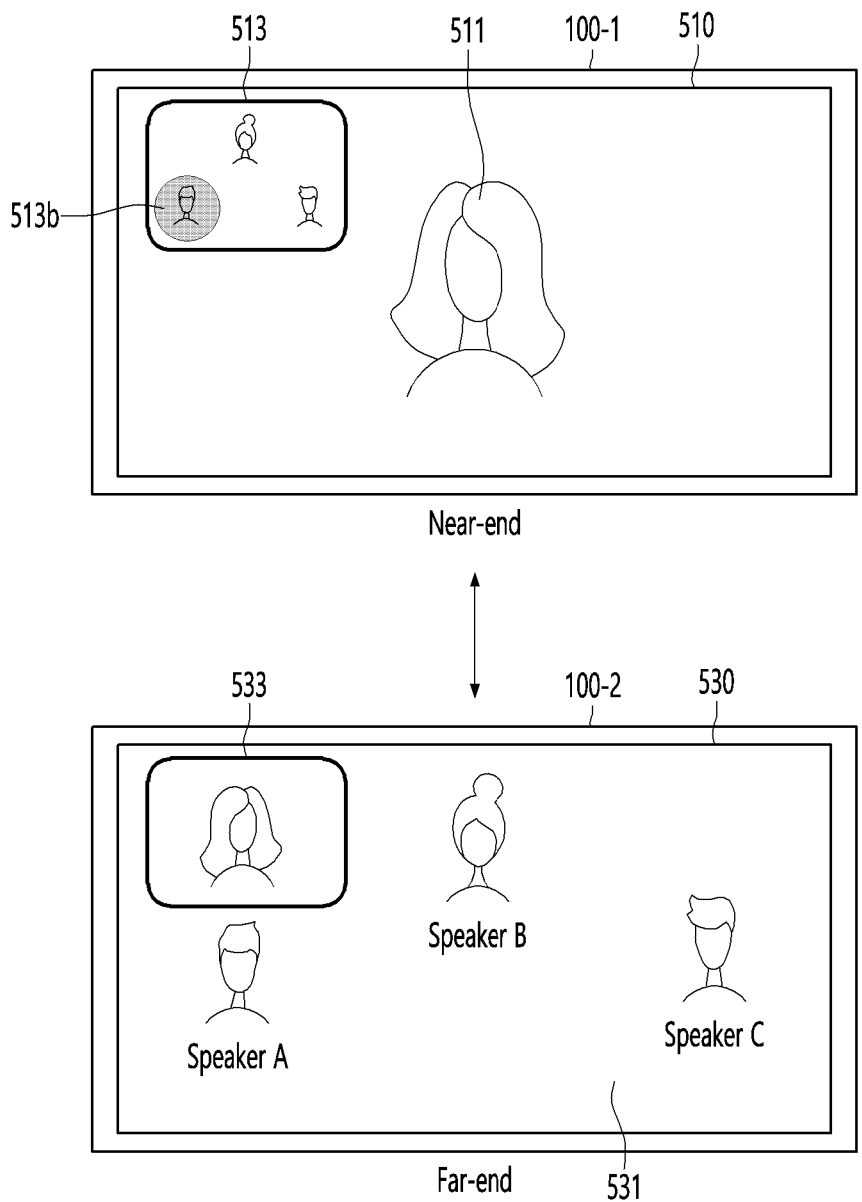
FIG. 8 is a view illustrating an example in which one speaker is selected from a far-end image when a focusing mode is a narrow focusing mode, according to an embodiment of the present disclosure.

In particular, FIG. 8 is a view illustrating an example in which one speaker is selected from a far-end image when the focusing mode is the narrow focusing mode, according to an embodiment of the present disclosure. Referring to FIG. 8, the user of the first terminal 100-1 selects the first speaker image 513b corresponding to the first speaker A among the entire region of the far-end image 513. The first terminal 100-1 then transmits, to the second terminal 100-2, focusing mode setting information indicating the narrow focusing mode, selection information of a specific speaker (Speaker A), and speaker focus information including coordinates of the specific speaker (Speaker A).

Figure 9:
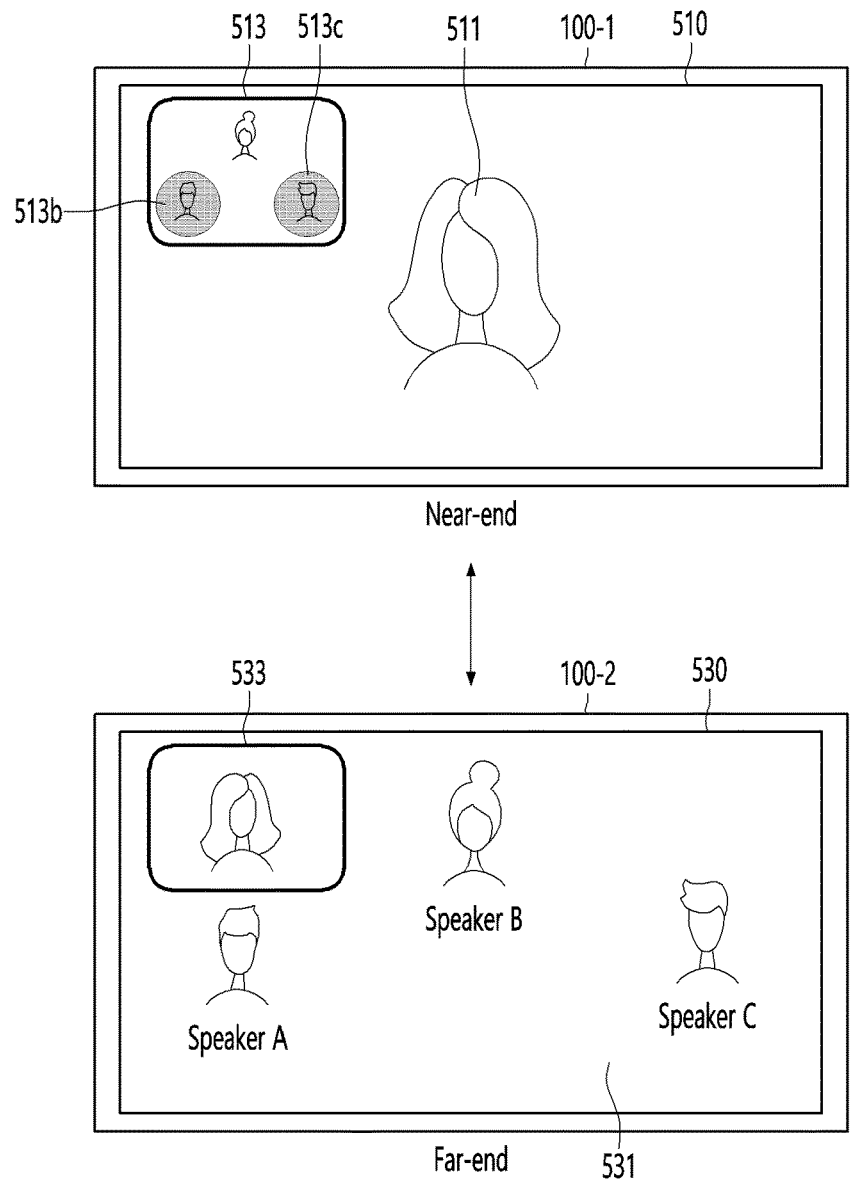
FIG. 9 is a view illustrating an example in which a plurality of speakers are selected from a far-end image when a focusing mode is a narrow focusing mode, according to an embodiment of the present disclosure.

Next, FIG. 9 is a view illustrating an example in which a plurality of speakers are selected from a far-end image when the focusing mode is the narrow focusing mode, according to an embodiment of the present disclosure. Referring to FIG. 9, the user of the first terminal 100-1 can select a first speaker image 513b corresponding to the first speaker A and a second speaker image 513c corresponding to the second speaker B among the entire regions of the far-end image 513. The first terminal 100-1 then transmits, to the second terminal 100-2, focusing mode setting information indicating the narrow focusing mode, selection information of the first and second speakers (Speakers A and B), and speaker focus information including coordinates of each of the first and second speaker images.

Returning to the description of FIG. 6, the processor 180-2 of the second terminal 100-2 can calculate an angle between the selected speaker and the reference microphone. That is, the processor 180-2 can calculate an angle between the speaker image 531 and the reference point corresponding to the reference microphone.

In another embodiment, when a plurality of speakers are selected, the processor 180-2 can calculate an angle between each speaker and the reference microphone. That is, the processor 180-2 can obtain a first angle between the selected first speaker and the reference microphone and a second angle between the selected second speaker and the reference microphone. The processor 180-2 of the second terminal 100-2 performs beamforming by using one or more obtained angles (S623), and transmits third audio, on which beamforming has been performed, to the first terminal 100-1 through the communication unit 110-2 (S625).

In an embodiment, when one speaker is selected, the processor 180-2 can perform narrow beamforming using an angle between the selected speaker and the reference microphone. The narrow beamforming includes a method of increasing a gain of a voice signal input at a corresponding angle and decreasing a gain of an input voice signal at angles other than the corresponding angle. This will be described below.

The first terminal 100-1 outputs the received third audio (S627). In addition, the processor 180-1 can output the second audio through the sound output unit 152 provided in the first terminal 100-1, or output the second audio to a speaker connected to the first terminal 100-1.

Figure 10:
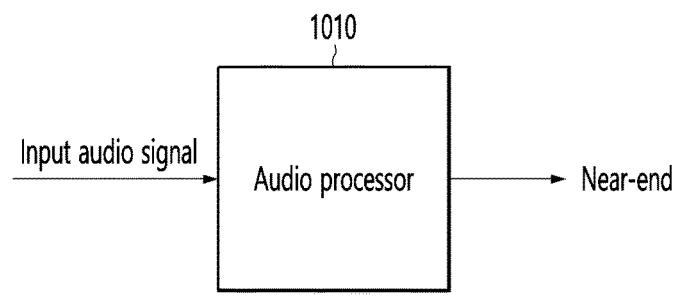
FIGS. 10 to 12 are views illustrating a process of processing audio in a far-end device according to a focusing mode.
Figure 11:
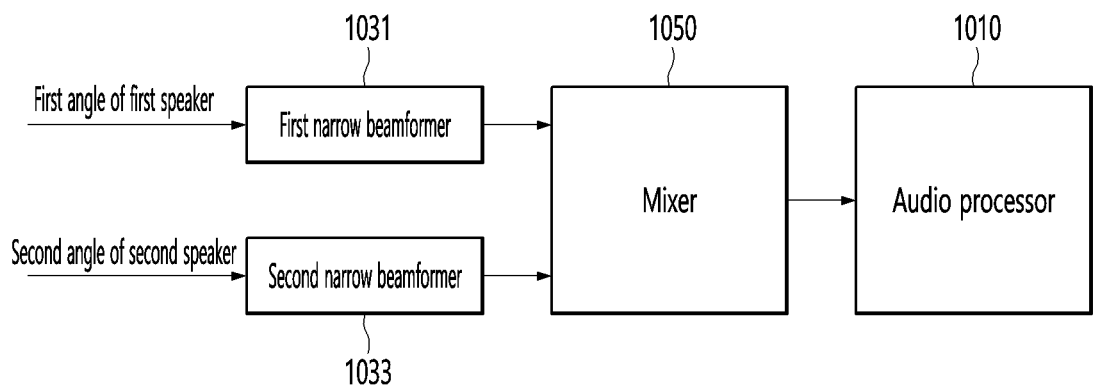
Figure 12:
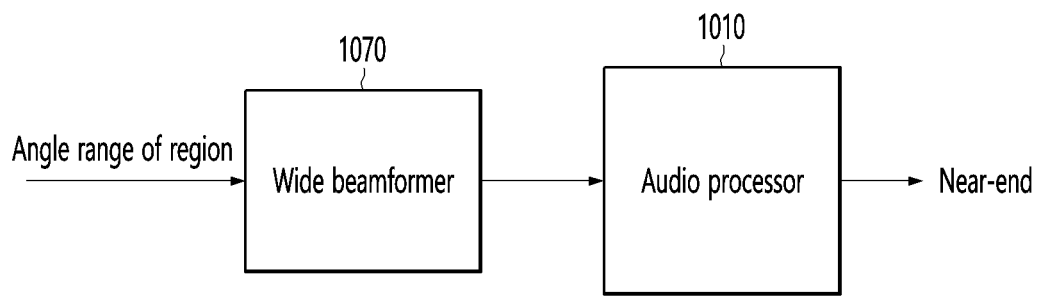

Next, FIGS. 10 to 12 are views illustrating a process of processing audio in a far-end device according to a focusing mode. In particular, FIG. 10 is a view illustrating a process of processing audio in the default mode, FIG. 11 is a view illustrating a process of processing audio when two speakers are selected in a narrow focusing mode, and FIG. 12 is a view illustrating a process of processing audio in a wide focusing mode.

In FIGS. 10 to 12, the near-end device is the first terminal 100-1, and the far-end device is the second terminal 100-2. Referring to FIG. 10, when the focusing mode is the default mode, the audio processor 1010 of the second terminal (the far-end device) 100-2 performs noise reduction (NR) on the input audio signal, and transmits audio, on which the NR has been performed, to the first terminal (the near end device) 100-1 through the communication unit 110-2.

Next, FIG. 11 illustrates an audio processing process when the focusing mode is the narrow focusing mode and two speakers are selected. As shown, a first narrow beamformer 1031, a second narrow beamformer 1033, a mixer 1050, and an audio processor 1010 of FIG. 11 can be included in the processor 180-2, or can be configured separately.

The first narrow beamformer 1031 of the second terminal 100-2 can perform beamforming on the audio signal using the first angle of the selected first speaker. Also, the second narrow beamformer 1033 of the second terminal 100-2 can perform beamforming on the audio signal using the second angle of the selected second speaker.

The first narrow beamformer 1031 of the second terminal 100-2 can perform adaptive beamforming on the voice signal using the first angle, and the second narrow beamformer 1033 can perform adaptive beamforming on the voice signal using the second angle. Further, the adaptive beamforming uses an angle to learn an increase a power corresponding to a corresponding angle in a power spectrum of a voice signal.

In addition, the mixer 1050 of the second terminal 100-2 can mix a first output audio signal of the first narrow beamformer 1031 with a second output audio signal of the second narrow beamformer 1033. The mixer 1050 of the second terminal 100-2 can also perform NR on the mixed audio signal, and transmit a final audio signal, on which NR has been performed, to the first terminal 100-1 through the communication unit 110-2.

Next, FIG. 12 illustrates a process of processing audio in a far-end device when the focusing mode is the wide focusing mode and a specific region is selected from a far-end image displayed by a near-end device. The processor 180-2 of the second terminal 100-2 can obtain the angle range of the region selected from the far-end image by the user of the first terminal 100-1.

In addition, the processor 180-2 can obtain the angle range of the selected region based on coordinate information of the selected region among the entire regions of the far-end image. The wide beamformer 1070 of the second terminal 100-2 can perform adaptive beamforming with respect to the obtained angle range. Further, the wide beamformer 1070 and the audio processor 1010 can be included in the processor 180-2, or can be configured separately.

The adaptive beamforming increases a power corresponding to a corresponding angle range in a power spectrum of a voice signal. Further, the audio processor 1010 of the second terminal 100-2 can transmit the beamforming result performed by the wide beamformer 1070 to the first terminal 100-1. As described above, according to an embodiment of the present disclosure, the user of the near-end device can listen to a voice of a speaker or a region desired by the user with more emphasis.

Figure 13:
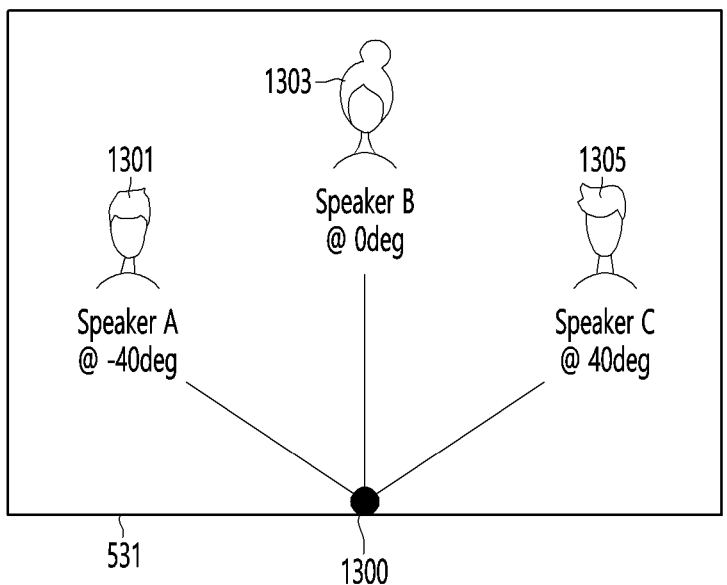
FIG. 13 is a view illustrating a process of obtaining an angle between a speaker and a reference point according to an embodiment of the present disclosure.

Next, FIG. 13 is a view illustrating a process of obtaining an angle between a speaker and a reference point according to an embodiment of the present disclosure. In particular, FIG. 13 illustrates a speaker image 531 displayed by the far-end device (the second terminal).

The speaker image 531 can include a first speaker image 1301 corresponding to a first speaker A, a second speaker image 1303 corresponding to a second speaker B, and a third speaker image 1305 corresponding a third speaker C. The processor 180-2 can define an angle between a reference point 1300 and the second speaker image 1303 positioned on a straight line from the reference point 1300 to 0 degrees. The reference point 1300 can correspond to a point where the reference microphone is located.

The processor 180-2 can obtain −40 degrees between the first speaker image 1301 and 0 degrees as an angle between the first speaker image 1301 and the reference point 1300. The processor 180-2 can also obtain 40 degrees between the third speaker image 1305 and 0 degrees as an angle between the third speaker image 1305 and the reference point 1300.

Figure 14A:
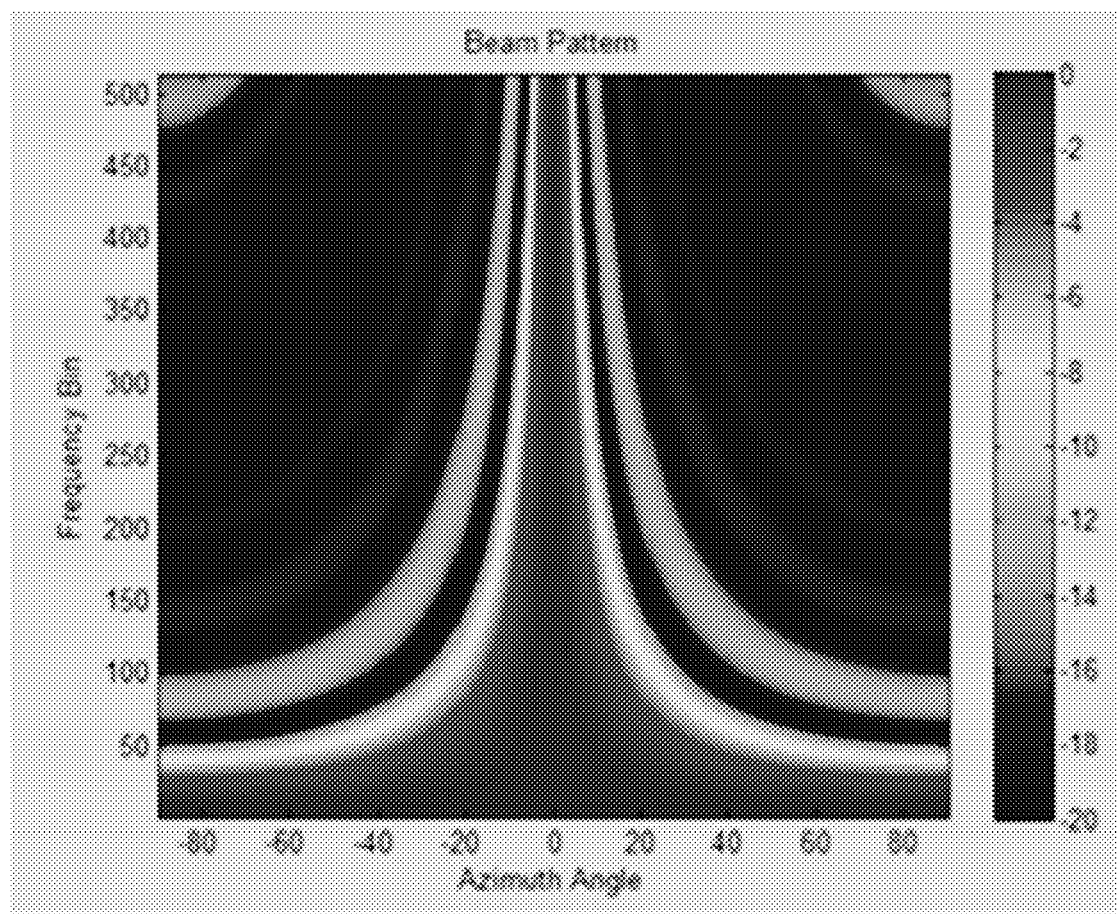
FIGS. 14A to 14C are views illustrating beamforming patterns showing results of performing narrow beamforming and wide beamforming according to an embodiment of the present disclosure.
Figure 14B:
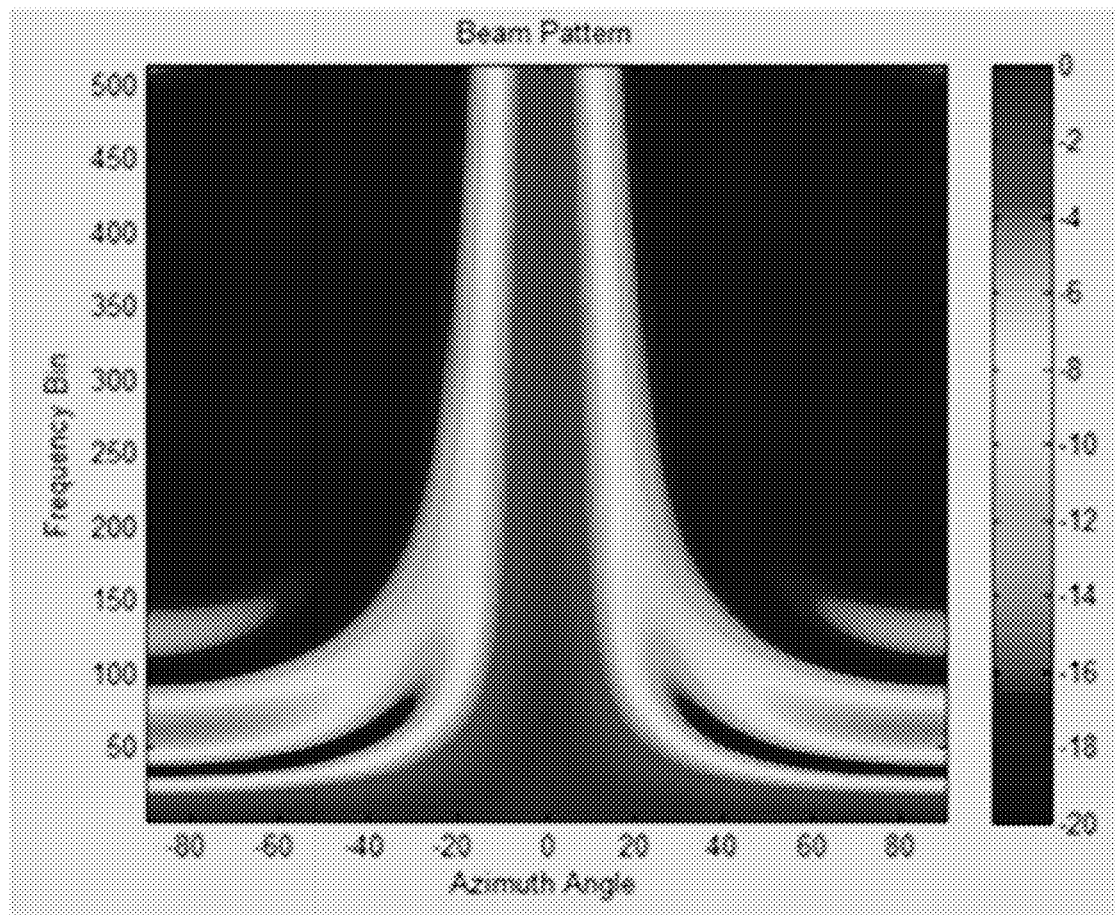
Figure 14C:
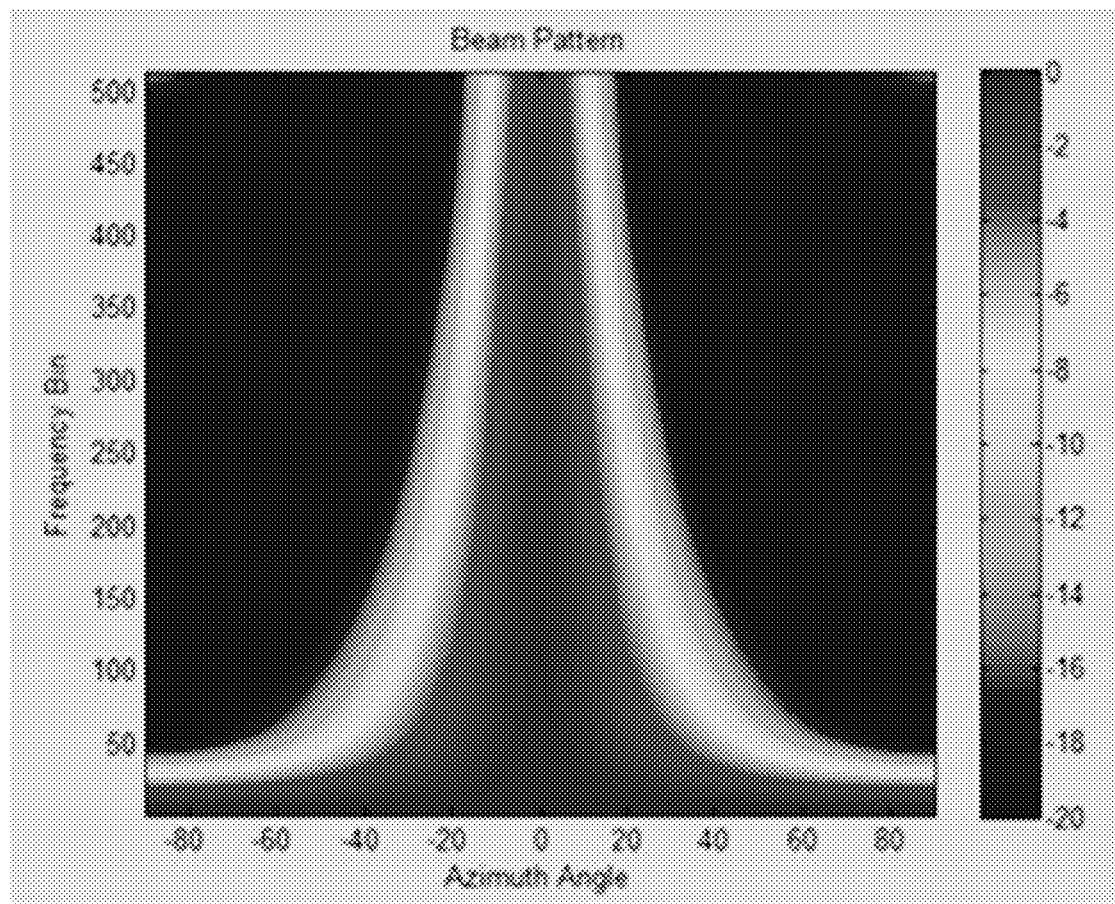

Next, FIGS. 14A to 14C are views illustrating beamforming patterns showing results of performing narrow beamforming and wide beamforming according to an embodiment of the present disclosure. In particular, FIG. 14A is a beam pattern showing a result of performing narrow beamforming, FIG. 14B is a beam pattern showing a result of performing wide beamforming in a range of 40 degrees, and FIG. 14C is a beam pattern showing a result of performing wide beamforming in a range of 60 degrees. A horizontal axis of each beam pattern represents an angle from −90 degrees to 90 degrees, and a vertical axis of each beam pattern represents a frequency bin (interval between samples).

Referring to FIG. 14A, for the narrow beamforming, it can be seen that a beam in a direction of a specific angle (e.g., 0 degrees) is the strongest. Referring to FIG. 14B, it can be seen that a beam is strong in a direction of a 40-degree angle range from −20 degrees to 20 degrees. Referring to FIG. 14C, it can be seen that a beam is strong in a direction of a 60-degree angle range from −30 degrees to 30 degrees.

As described above, according to an embodiment of the present disclosure, the user of the near-end device can more intensively listen to a voice of a specific speaker or a specific region desired by the user.

The present disclosure described above can be implemented as computer-readable code on a medium in which a program is recorded. The computer-readable medium includes all kinds of recording devices in which data readable by a computer system is stored. Examples of computer-readable media include a Hard Disk Drive (HDD), a Solid State Disk (SSD), a Silicon Disk Drive (SDD), a ROM, a RAM, a CD-ROM, a magnetic tape, a floppy disk, an optical data storage device, etc. In addition, the computer may include the processor 180 of the artificial intelligence device.

The invention claimed is:

1. A far-end terminal comprising:
a communication interface configured to wirelessly communicate with a near-end terminal for performing a video conference between the far-end terminal and the near-terminal;
a camera configured to capture a region in front of the far-end terminal including a plurality of counterpart speakers;
a display configured to display the plurality of counterpart speakers captured through the camera and to display an image of a speaker at the near-end terminal; and
a processor configured to:
receive focusing mode setting information from the near-end terminal indicating an operation mode of the near-end terminal is a wide focusing mode;
in response to the focusing mode setting information indicating the operation mode is the wide focusing mode, obtain an angle range corresponding to a narrower partial region of an entire region including the plurality of counterpart speakers at the far-end terminal;
perform selective audio focusing on a received voice within the obtained angle range to selectively increase a gain of the received voice and to selectively decrease a gain of other received voices outside the obtained angle range; and
transmit audio, which is a result of performing the beamforming, to the near-end terminal,
wherein when obtaining the angle range, the processor is further configured to obtain a first angle between a first speaker included in the captured region and a reference point, and obtain a second angle between a second speaker included in the captured region and the reference point, and wherein the obtained angle range is between the first angle and the second angle.

2. The far-end terminal of claim 1, wherein the processor is further configured to:
receive focusing mode setting information from the near-end terminal indicating an operation mode of the near-end terminal is a default focusing mode; and
in response to the focusing mode setting information indicating the operation mode is the default focusing mode, transmit audio from the plurality of counterpart speakers to the near-end terminal without performing selective audio focusing.

3. The far-end terminal of claim 1, wherein the focus mode setting information further includes speaker focus information when the focusing mode setting information indicates the wide focusing mode.

4. The far-end terminal of claim 3, wherein the processor is further configured to obtain the angle range using coordinates of the narrower partial region included in the received speaker focus information.

5. The far-end terminal of claim 3, wherein the narrower partial region is designated by a speaker at the near-end terminal and includes a narrower region having fewer counterpart speakers than the region including the plurality of counterpart speakers at the far-end terminal.

6. The far-end terminal of claim 5, wherein the speaker focus information includes coordinates indicating positions of the fewer counterpart speakers included in the captured region.

7. The far-end terminal of claim 1, wherein the processor is further configured to perform the beamforming by executing an algorithm for increasing the gain of the voice within the obtained angle range and decreasing a gain of a voice signal input outside the obtained angle range.

8. The far-end terminal of claim 1, wherein the focusing mode setting information from the near-end terminal further indicates the operation mode of the near-end terminal is a narrow focusing mode and includes a position of one counterpart speaker in the region among the plurality of counterpart speakers, and
wherein the processor is configured to:
obtain an angle between the selected one counterpart speaker and a reference point; and
perform beamforming on the received voice to increase the gain of the received voice signal corresponding to the obtained angle.

9. The far-end terminal of claim 1, wherein the focusing mode setting information from the near-end terminal further indicates the operation mode of the near-end terminal is a narrow focusing mode and includes a position of at least first and second counterpart speakers in the region among the plurality of counterpart speakers, and wherein the processor is configured to:
obtain a first angle between the first counterpart speaker and a reference point;
obtain a second angle between the second counterpart speaker and the reference point;
perform first beamforming on the received voice at the first angle;
perform second beamforming on the received voice at the second angle; and
generate a final mixed audio signal by mixing the voice beamformed at the first angle and the voice beamformed at the second angle.

10. The far-end terminal of claim 1, wherein the camera is further configured to capture live images of the plurality of counterpart speakers at the far-end terminal.

11. A video conference system comprising:
a near-end terminal including a first camera and a first display; and
a far-end terminal including a second camera and a second display, wherein the near-end terminal and far-end terminal perform a video conference between each other,
wherein the far-end terminal captures a region in front of the far-end terminal including a plurality of counterpart speakers via the second camera and transmits the captured region to the near-end terminal,
wherein the near-end terminal displays the captured region on the first display, receives a user designated narrower partial region of the captured region displayed on the first display, and transmits the user designated narrowing partial region to the far-end terminal with focusing mode setting information indicating an operation mode of the near-end terminal is a wide focusing mode, and
wherein the far-end terminal obtains an angle range corresponding to the narrower partial region including one or more counterpart speakers at the far-end terminal, and performs selective audio focusing on a received voice within the obtained angle range to selectively increase a gain of the received voice and to selectively decrease a gain of other received voices outside the obtained angle range, and transmits audio, which is a result of performing the beamforming, to the near-end terminal,
wherein when obtaining the angle range, the far-end terminal is further configured to obtain a first angle between a first speaker included in the captured region and a reference point, and obtain a second angle between a second speaker included in the captured region and the reference point, and
wherein the obtained angle range is between the first angle and the second angle.

12. The system of claim 11, wherein the far-end terminal is further configured to:
in response to the focusing mode setting information indicating the operation mode is a default focusing mode, transmit audio from the plurality of counterpart speakers to the near-end terminal without performing selective audio focusing.

13. The system of claim 11, wherein the focus mode setting information further includes speaker focus information when the focusing mode setting information indicates the wide focusing mode.

14. The system of claim 13, wherein the far-end terminal is further configured to obtain the angle range using coordinates of the narrower partial region included in the received speaker focus information.

15. The system of claim 13, wherein the narrower partial region includes a narrower region having fewer counterpart speakers than the region including the plurality of counterpart speakers at the far-end terminal, and
wherein the speaker focus information includes coordinates indicating positions of the fewer counterpart speakers included in the captured region.

16. The system of claim 11, wherein the far-end terminal is further configured to perform the beamforming by executing an algorithm for increasing the gain of the voice within the obtained angle range and decreasing a gain of a voice signal input outside the obtained angle range, and
wherein the second camera of the far-end terminal is further configured to capture live images of the plurality of counterpart speakers at the far-end terminal.

17. The system of claim 11, wherein the focusing mode setting information from the near-end terminal further indicates the operation mode of the near-end terminal is a narrow focusing mode and includes a position of one counterpart speaker in the region among the plurality of counterpart speakers, and wherein the far-end terminal is configured to:

obtain an angle between the selected one counterpart speaker and a reference point; and perform beamforming on the received voice to increase the gain of the received voice signal corresponding to the obtained angle.

18. The system of claim 11, wherein the focusing mode setting information from the near-end terminal further indicates the operation mode of the near-end terminal is a narrow focusing mode and includes a position of at least first and second counterpart speakers in the region among the plurality of counterpart speakers, and wherein the far-end terminal is configured to:

obtain a first angle between the first counterpart speaker and a reference point;

obtain a second angle between the second counterpart speaker and the reference point;

perform first beamforming on the received voice at the first angle;

perform second beamforming on the received voice at the second angle; and generate a final mixed audio signal by mixing the voice beamformed at the first angle and the voice beamformed at the second angle.

\* \* \* \* \*